Oct. 26, 1943.

M. H. TUFT ET AL 2,332,617

ROD WEEDER BEARING

Filed April 16, 1941

INVENTORS.
MILES H. TUFT
CLARENCE T. RASMUSSEN
BY
ATTYS.

Patented Oct. 26, 1943

2,332,617

UNITED STATES PATENT OFFICE 2,332,617

ROD WEEDER BEARING

Miles H. Tuft, Ottumwa, Iowa, and Clarence T. Rasmussen, Moline, Ill., assignors to Deere & Company, Moline, Ill., a corporation of Illinois Application April 16, 1941, Serial No. 388,788

12 Claims. (Cl. 97—42)

The present invention relates generally to agricultural machines and more particularly to rod weeders and the like. More particularly, the present invention is concerned with the bearings for the rotary rod of a rod weeder or the like.

A rotary rod weeder consists generally of two or more shanks carrying shoes at their lower ends in which a rotary rod is disposed, together with suitable framework and other operative structure. The rod weeder is operated with the shoes and the rod below the surface of the ground a suitable distance, the rod being propelled broadside through the soil and rotated in such a manner as to destroy weeds and other growth. Bearings have to be provided in the shoes to receive the rotary rod, and since such bearings operate under the surface of the ground and in intimate contact with soil, grit and the like, it has been a serious problem to provide adequate bearing for the rod without objectionably increasing the draft of the implement.

The object and general nature of this invention is the provision of a bearing for the rotary rod of a rotary rod weeder which is so constructed and arranged as to provide adequate bearing and support for the rotary rod but without offering too much resistance to the forward movement of the rod and shoes through the ground. More specifically, it is a feature of this invention to provide a bearing construction in which a rod receiving journal member is formed generally spherically and is supported in the rod weeder shoe by a bearing block having a concave surface to receive the spherical journal member. The spherical journal member rotates with the rod and being of generally spherical configuration provides adequate bearing surface to sustain all loads imposed thereon, and by virtue of its shape it serves to minimize the resistance to forward travel of the bearing structure and associated parts of the shoe and rod. Another feature of this invention is the provision of external grooves on the rod receiving journal member which are so angularly related that the grooves tend to force dirt, soil and the like out from between the bearing block and the rod-receiving shoe, thereby keeping the bearing surfaces clean and easy running. Further, the grooves also act to prevent the dirt and soil from clogging in the bearing and materially increasing the power required to rotate the rod in operation.

Still further, it is an additional feature of this invention to provide means cooperating with the concave bearing block for insuring that the spherical journal member on the rotary rod will be held in place in the shoe, irrespective of side thrusts and the like which might tend to force the journal member out of place, especially when turning the implement with the rod in the ground.

These and other objects and advantages of the present invention will be apparent to those skilled in the art after a consideration of the following description, taken in conjunction with the accompanying drawing in which a preferred embodiment of the invention has been illustrated.

Figure 1:
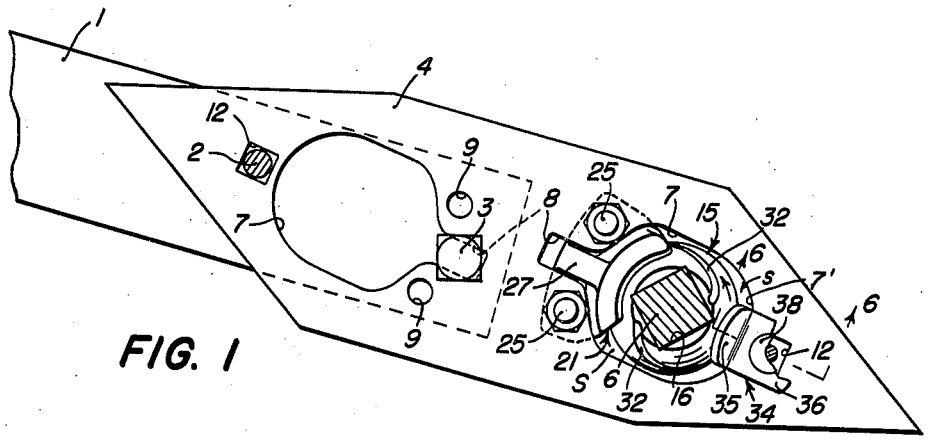
Figure 1 is a side view of the lower end of a rod weeder shank or pendant, together with the rod weeder shoe and associated bearing structure in which the principles of the present invention have been incorporated.
Figure 5:
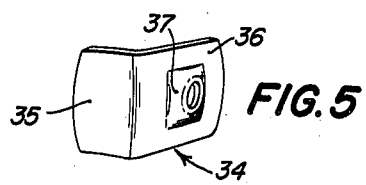
Figure 6:
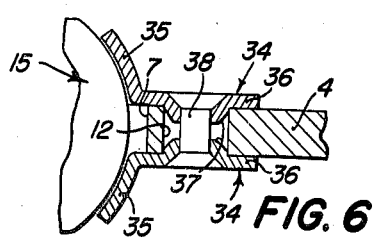

Figure 5 is a perspective view of one of the two removable lugs which serve the double purpose of providing a bearing surface at the front end of the shoe of adequate lateral dimension and means embracing the spherical bushing or journal member a sufficient extent to retain the latter in position in the rod weeder shoe; and Figure 6 is an enlarged fragmentary section taken along the line 6—6 of Figure 1.

Figure 2:
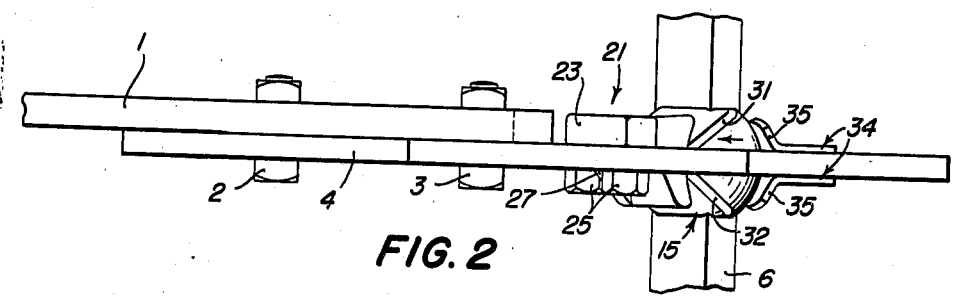
Figure 2 is a top view of the structure shown in Figure 1.

Referring now to the drawing, more particularly to Figures 1 and 2, the reference numeral 1 indicates one of the shanks or pendants of a rod weeder, the front end of which is formed so as to extend forwardly and slightly downwardly. The front portion of the shank 1 is apertured to receive a pair of bolts 2 and 3 by which a shoe 4 is adapted to be fixed rigidly to the shank. The shoe 4 consists of a flat plate-like member and, as illustrated, is reversible end for end, although such construction is not essential to the present invention in its broader aspects. To receive the rotary rod, which is indicated by the reference numeral 6, the shoe 4 is provided with an aperture 7 which is of generally rounded configuration with an inwardly extending slotted portion 8, on each side of which is a pair of bolt receiving openings 9. Usually the rotary rod of a rod weeder is square in cross section, and such is the form shown in Figures 1 and 2. At each end of the reversible shoe 4, between the rod receiving openings 7 and the ends, is a square opening 12 which will be referred to later.

Figure 3:
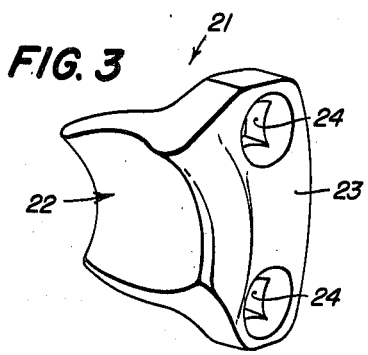
Figure 3 is a perspective view of the bearing block showing the concave portion thereof that receives the spherical rod-receiving bushing or journal member.
Figure 4:
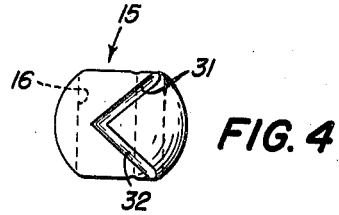
Figure 4 is a view of the spherical bushing or journal member, showing the dirt ejecting grooves in the bearing surface thereof.

A spherical bushing or bearing member 15 is provided with a central square opening 16 so as to fit slidably but non-rotatably on the weeder rod 6. If the latter is hexagonal or some shape other than square, which is preferred, the opening 16 in the journal member 15 will, of course, correspond. The spherical or ball-like journal member 15 is adapted to be disposed within the front shoe opening 7. Since in operation the greatest pressure is rearwardly and upwardly, to sustain this pressure I provide a bearing block 21 which is formed with a concave spheroidal bearing surface 22. The member 21 is provided with an attaching flange 23 which is apertured, as at 24, to receive a pair of bolts 25 which secure the bearing block 21 in place on the shoe 4 with the bearing surface 22 directly behind the spherical journal member 15. As best shown in Figures 2 and 3, the attaching flange 23 is disposed at one side of the plane of the center of the socket 22, whereby when the block 21 is fixed to the shoe, the center of the bearing surface 22 lies in the central plane of the shoe (Figure 2). The bolts 25 when tightened securely hold the bearing block 15 against the shoe plate 4, but to sustain the greater proportion of forces due to the rotation of the journal member 15 we provide a transverse fin 27 on the bearing block 21, the fin 27 having a thickness that fits snugly within the slot 8. By this means the bearing block is secured firmly and rigidly to the rod weeder shoe 4.

It will be noted from Figure 1 that the bearing block 21 is so formed and so mounted on the shoe 4 that the bearing surface 22 of the member 21 is disposed in a position rearwardly and upwardly with respect to the center of the spherical bushing or journal member 15. A line passing through the center of the surface 22 and the center of the ball 15, or the axis of rotation of the rod 6, will be disposed at an angle of approximately 30 degrees with respect to the horizontal when normally in operation. This leaves an adequate space S below the bearing block 21 to permit soil to be worked out of the bearing. It will be remembered that this bearing operates directly in contact with the soil and that no lubrication is practical. Some bearings have a tendency to clog with soil building up between the two bearing surfaces of the bearing block and the journal member, and sometimes the bearing binds, resulting in broken driving chains and other damage. By virtue of disposing the bearing surface of the bearing block 21 at a point upwardly and rearwardly of the journal member, the bearing surface is disposed in the line of pressure and provides the space S just referred to which facilitates soil and dirt falling out of the bearing or working out of the bearing during operation. This is further aided by the space s between the front of the bearing 15 and the forward edge 7' of the shoe opening 7.

In order to facilitate working the dirt out of the bearing, we provide the journal member 15 with grooves 31 and 32 on its periphery. These grooves are fairly shallow but are arranged at an angle to one another so as to form, in effect, a V, with the point or apex extending in the direction of rotation of the journal member 15, which direction of rotation is indicated in the drawing by the small arrow. Disposing the grooves 31 and 32 at an angle, as indicated, provides a very efficient construction for working soil, dirt and the like out from between the cooperating bearing surfaces of the members 15 and 21 and results in a bearing that is self-cleaning, which results in light draft and maximum penetrating ability. The penetrating ability of a rod weeder shoe having the bearing construction of the present invention is materially enhanced by the fact that the journal member 15 is spherical, as compared with prior constructions which employ cylindrical bearings presenting much greater resistance to movement of the shoe through the soil. The shape of the spherical bushing and the fact that it rotates, results in a unit that can be forced through the soil with minimum draft. The journal member 15 and the bearing block 21 are of wear-resisting material that is extremely hard and in normal operation takes on a mirror-like polish which insures minimum friction and long life in these important parts.

In operation the soil pressure, as mentioned above, is directed upwardly and rearwardly at about an angle of 30 degrees, and since the bearing block 21 has the concave spheroidal surface 22, which embraces the spherical journal member 15, the latter is therefore held against lateral displacement along the rod 6. It may occur, however, that side thrust may develop, and in order to insure that the ball-like bushing 15 will not be forced laterally out of position in the shoe, we provide a pair of retaining pieces 34, one for each side of the bearing shoe 4. These retaining members are practically identical and each includes an angled bushing engaging section 35 and an attaching section 36. The latter is formed with a substantially square inwardly extending apertured boss 37 that is adapted to fit in the square hole 12 in front of the rod-receiving shoe opening 7. A flat head rivet 38 extends through the inwardly disposed bosses 37 of the retaining members 34 and serves as means for securing the members 34 in position, with the angled sections 35 extending around the front portion of the bushing 15 for a considerable extent, embracing the same so that the ball 15 will not be forced laterally out of the shoe 4. As shown in Figure 2, the laterally outer ends 35 of the members 34 extend laterally about the bushing 15 at the front as far as the bearing 21 extends laterally about the bushing 15 at the rear, but the vertical dimension of the members 34, while sufficient to provide the requisite strength, is not great enough to interfere with the passage of the unit through the soil, which is facilitated by the shape of the bushing or journal member 15, as mentioned above.

When the extension members 34 are used, the bearing is assembled by first bringing the ball 15 in position in the shoe opening 7 against the parts 34. Then the bearing member 21 is disposed entirely to one side of the shoe with the socket 22 against the spheroidal surface of the member 15 and with the edge opposite the flange 23 adjacent the rear edge of the shoe opening 7. The outer face or surface of the spheroidal socket section is also spheroidal or curved, so that the bearing member 15 may readily be brought into position in the shoe opening behind the ball 15 merely by sliding the bearing member 21 over the surface of the ball until the fin 27 seats in the opening 8 and the center of the spheroidal socket surface 22 lies in the plane of the shoe 4.

It will also be noted from Figure 6 that the recessed boss 37 permits the use of a flat head rivet so that there are no objectionable laterally extending parts that would tend to increase draft.

Instead of a rivet, a screw or bolt may be used. However, it has been found that with implements which are subject to the operating conditions that rod weeders encounter, small screws or bolts are quite likely to rust so tight that they are harder to remove than rivets. Mention was made above of the fact that the shoe 4 is reversible end to end in order to renew the point. When it is desired to reverse the shoe 4, it is necessary to remove the rod, the journal members and the bearing blocks from the several shoes, and in order to dispose the attaching bolt 2 in the opening 12 which when that opening is at the forward end receives the rivet 38, it is also necessary to remove the holding members 34. To do this it is necessary for the farmer to drill out the rivet 38, but as mentioned above, this is easier to do than to remove a small screw or bolt, the threads of which have been rusted to the nut or other part into which it was originally screwed. After the shoe 4 has been reversed, the parts are reassembled and the other opening 7, which is now at the front end and the bearing block secured to the shoe 4. If the journal retaining members 34 are worn they may be replaced, but if they are not worn excessively they may be reattached by securing the same to the other opening 12 with a new rivet. In order to permit reversal of the shoe 4 the members 34 must, therefore, be removable. The square bosses 37 on the members 34 prevent the same from turning in the hole 12. While the use of a rivet to secure the members 34 in position is preferred, especially as compared with a flat head screw which might be passed through the apertured boss of one member and threaded into the other, the riveted construction being preferred because, as a practical proposition, it is even more removable than the screw attachment due to the tendency of the latter to rust tight, a bolt and nut attachment may be used if desired. However, the head or nut of the bolt would not be flush with the outer surfaces of the attaching sections 36 and would therefore offer additional resistance to the passage of the unit to the ground. If such additional resistance is not objectionable, the bolt and nut attachment may be used for the members 34. The riveted arrangement is, however, preferred. first because it provides a more secure attachment, and second, because it is generally as easy or easier to drill out the rivet than it is to loosen rusted screws or bolts, especially the relatively small size which would be used at this point.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. In a rod weeder, a shoe having an opening therein, an integral spheroidal journal member having a rod-receiving opening, an integral bearing block having a spheroidal socket adapted to receive said spheroidal journal member and an attaching section at one side, and means fixing said attaching section to the side of said shoe so as to dispose the central part of said socket substantially in the plane of said shoe and spaced from the edge of said opening a distance substantially equal to the diameter of said spheroidal journal member, whereby accidental displacement of the latter is prevented.

2. In a rod weeder, a shoe having an opening therein and a notch extending to said opening, a journal member adapted to be disposed therein, a bearing block having a socket section to receive said journal member and an attaching section adapted for attachment to said shoe with said socket section in said opening, and a projection on said bearing member adapted to be disposed in said notch and to sustain the forces tending to cause said socket section to rotate relative to said shoe with said journal member.

3. In a rod weeder, a shoe having an opening therein, means at the front edge of said shoe opening forming laterally outwardly and rearwardly extending journal-retaining sections, an integral spheroidal journal member having a rod-receiving opening and adapted to be inserted in said shoe opening and seated against said journal-retaining sections, an integral bearing block having a spheroidal socket adapted to receive said spheroidal journal member and an attaching section at one side, the radially outer face of the socket portion of said bearing block also being spheroidal, whereby, after said spheroidal journal member has been seated in said shoe opening against said journal-retaining sections, said bearing block may be placed against said journal member at one side of said shoe opening and then passed into position in the shoe opening behind said journal member, and means fixing said attaching section to the side of said shoe.

4. In a rod weeder, a shoe having a journal-receiving opening and a non-circular opening forwardly thereof, a pair of journal-retaining members having non-circular portions seated in said second opening, and means for holding said members in position with said portions seated in said second opening.

5. In a rod wheeder, a shoe having a journal-receiving opening and a non-circular opening forwardly thereof, a pair of journal-retaining members having non-circular portions seated in said second opening, and means extending through said second opening for holding said members in position.

6. In a rod weeder, a shoe having a journal-receiving opening therein, a spheroidal journal member disposed in said opening, and a pair of journal-retaining members secured to said shoe generally forwardly of said opening and extending generally laterally outwardly thereof.

7. In a rod weeder, a shoe having a journal-receiving opening therein, a spheroidal journal member disposed in said opening, and a pair of journal-retaining members secured to said shoe generally forwardly of said opening and extending generally laterally outwardly thereof, the laterally outer portions of said journal-retaining members being concave so as to fit against said spheroidal journal member.

8. In a rod weeder, a rod-receiving journal member comprising an integral annular ball-like part having a rod-receiving opening and a spheroidal exterior bearing surface, a stationary bearing block having a concave bearing surface and adapted to receive and embrace said ball-like journal member, and a rod weeder shoe having an opening and journal-engaging means on said shoe at the forward edge of the opening therein, the length of said shoe opening being substantially equal to the diameter of said ball-like journal member and the thickness of said bearing block, whereby when said journal member and said bearing member are assembled in nested relation in said shoe opening, the ball-like journal member is retained against lateral displacement by said forward journal-engaging means and the concave bearing member.

9. A lubricant-less bearing construction for operation under the surface of the ground and in intimate contact with the soil, comprising a journal member and a bearing member receiving said journal member, the latter having one or more grooves on its exterior surface disposed at a rearwardly and outwardly extending angle to the direction of rotation of said journal member and extend laterally outwardly beyond the bearing member so as to work soil and the like out from between the latter and the bearing member.

10. In a rod weeder having a rod and a rod-supporting shoe, a spheroidal journal member adapted to be mounted on the rod, a concave bearing member adapted to receive said spheroidal journal member, and means fixing said bearing member to said shoe in a rearwardly and upwardly disposed position so as to leave an open space between the lower part of the bearing member and the adjacent portion of the shoe, so as to facilitate the egress of soil and the like from between the journal and bearing members.

11. In a rod weeder having a rod and a rod-supporting shoe, a spheroidal journal member adapted to be mounted on the rod, a concave bearing member adapted to receive said spheroidal journal member, and means fixing said bearing member to said shoe in a rearwardly and upwardly disposed position so as to leave an open space generally behind the journal member and between the lower part of the bearing member and the adjacent portion of the shoe, so as to facilitate the egress of soil and the like from between the journal and bearing members.

12. In a rod weeder having a rod and a rod-supporting shoe, a spheroidal journal member adapted to be mounted on the rod, a concave bearing member adapted to receive said spheroidal journal member, means fixing said bearing member to said shoe in a rearwardly and upwardly disposed position so as to leave an open space generally behind the journal member and between the lower part of the bearing member and the adjacent portion of the shoe, so as to facilitate the egress of soil and the like from between the journal and bearing members, and groove means on said journal member for working soil and the like from between said members into said open space.

MILES H. TUFT.
CLARENCE T. RASMUSSEN.